US011442335B2

(12) United States Patent
Mantel et al.

(10) Patent No.: US 11,442,335 B2
(45) Date of Patent: Sep. 13, 2022

(54) SYSTEMS AND METHODS FOR MANAGING INCOHERENT LASER BEAMS

(71) Applicant: Q.ant GmbH, Stuttgart (DE)

(72) Inventors: Klaus Mantel, Baiersdorf (DE); Michael Foertsch, Ansbach (DE)

(73) Assignee: Q.ant GmbH, Stuttgart (DE)

( * ) Notice: Subject to any disclaimer, the term of this patent is extended or adjusted under 35 U.S.C. 154(b) by 83 days.

(21) Appl. No.: 16/856,182

(22) Filed: Apr. 23, 2020

(65) Prior Publication Data
US 2020/0249542 A1 Aug. 6, 2020

Related U.S. Application Data

(63) Continuation of application No. PCT/EP2018/078821, filed on Oct. 22, 2018.

(30) Foreign Application Priority Data

Oct. 27, 2017 (DE) .......................... 102017125342.4

(51) Int. Cl.
*G02F 1/39* (2006.01)
*G02B 27/48* (2006.01)
(Continued)

(52) U.S. Cl.
CPC ............... *G02F 1/39* (2013.01); *G02B 27/48* (2013.01); *G02F 1/3501* (2013.01); *G02F 1/353* (2013.01);
(Continued)

(58) Field of Classification Search
CPC ...... G02F 1/3501; G02F 1/3503; G02F 1/353; G02F 1/3532; G02F 1/39; G02B 27/48; G03B 21/2033; H04N 9/3129
See application file for complete search history.

(56) References Cited

U.S. PATENT DOCUMENTS

| 3,436,546 A | 4/1969 | Derderoam et al. |
| 3,818,129 A * | 6/1974 | Yamamoto ............. H01S 3/093 348/754 |

(Continued)

FOREIGN PATENT DOCUMENTS

| CN | 1713691 | 12/2005 |
| CN | 1721963 | 1/2006 |

(Continued)

OTHER PUBLICATIONS

DE Office Action in German Appln. No. 102017125342, dated Aug. 1, 2018, 11 pages (with English machine translation).
(Continued)

*Primary Examiner* — Daniel Petkovsek
(74) *Attorney, Agent, or Firm* — Fish & Richardson P.C.

(57) ABSTRACT

A laser light source for producing incoherent laser beams, in particular for speckle-free imaging and/or projection, with at least two different wavelengths, preferably with three different wavelengths, includes: at least two optical devices, in particular at least two optical parametric oscillators, which each have a nonlinear optical medium for respectively producing a signal beam and an idler beam, and a superposition device configured to respectively superpose either the signal beam or the idler beam of each of the at least two optical devices for producing an incoherent laser beam with the at least two different wavelengths. A laser projector for producing an image, in particular a speckle-free image, on a projection surface, can include such a laser light source.

20 Claims, 1 Drawing Sheet

(51) Int. Cl.
*G02F 1/35* (2006.01)
*G03B 21/20* (2006.01)

(52) U.S. Cl.
CPC ....... *G02F 1/3532* (2013.01); *G03B 21/2033* (2013.01); *G02F 1/3503* (2021.01)

(56) References Cited

U.S. PATENT DOCUMENTS

| | | | |
|---|---|---|---|
| 5,117,126 | A | 5/1992 | Geiger |
| 5,663,973 | A | 9/1997 | Stamm et al. |
| 5,828,424 | A | 10/1998 | Wallenstein |
| 6,233,025 | B1 | 5/2001 | Wallenstein |
| 6,233,089 | B1 | 5/2001 | Nebel |
| 8,508,841 | B2 | 8/2013 | Chou et al. |
| 10,042,232 | B2 | 8/2018 | Beutler et al. |
| 2008/0298403 | A1 | 12/2008 | Vachss |

FOREIGN PATENT DOCUMENTS

| | | |
|---|---|---|
| CN | 101192738 | 6/2008 |
| CN | 204290022 U | 4/2015 |
| DE | 4432029 A1 | 3/1996 |
| DE | 102008005129 A1 | 5/2009 |
| EP | 3206081 A1 | 8/2017 |
| JP | 2007-021509 A | 2/2007 |
| TW | 201238191 | 9/2012 |
| WO | WO 2009/059598 A1 | 5/2009 |
| WO | WO-2009104392 A1 * | 8/2009 ......... G03B 21/2053 |

OTHER PUBLICATIONS

Förtsch., "Development of a versatile source of single photons," Univ. Erlangen, 2015, Chapters 1-2, 18 pages (with English translation).
PCT International Preliminary Report on Patentability in International Appln. No. PCT/EP2018/078821, dated Apr. 28, 2020, 15 pages (with English translation).
PCT International Search Report and Written Opinion in International Appln. No. PCT/EP2018/078821, dated Jan. 24, 2019, 13 pages (with English translation).
Riechert., "Speckle Reduction in Projection Systems," Chapter 7, Univ. Karlsruhe, 2009, 78 pages.
Riechert., "Speckle Reduction in Projection Systems," Chapters 1-6, Univ. Karlsruhe, 2009, 99 pages.
TW Office Action in Taiwanese Appln. No. 107138051, dated Sep. 3, 2019, 4 pages, (English language translation).
CN Office Action in Chinese Appln. No. 201880078433.5, dated May 24, 2022, 12 pages (with English translation).

* cited by examiner

SYSTEMS AND METHODS FOR MANAGING INCOHERENT LASER BEAMS

CROSS REFERENCE TO RELATED APPLICATIONS

This application is a continuation of and claims priority under 35 U.S.C. § 120 from PCT Application No. PCT/EP2018/078821, filed on Oct. 22, 2018, which claims priority from German Application No. 10 2017 125 342.4, filed on Oct. 27, 2017. The entire contents of each of these priority applications are incorporated herein by reference.

TECHNICAL FIELD

The present disclosure relates to laser light sources for producing incoherent laser beams, in particular for speckle-free imaging and/or projection, with at least two different wavelengths, preferably with three different wavelengths, and to laser projectors with such laser light sources. Furthermore, the present disclosure relates to methods for operating such laser light sources, and methods for operating such laser projectors.

BACKGROUND

Customary projection systems, as are used in common video projectors, for example, use a conventional interlaced beam path for projecting an object onto a projection surface. Here, metal vapor lamps are usually used as light sources.

In the past few years, laser projection systems have emerged as competitors to these projection systems, the use of said laser projection systems having already been predicted since the 1960s; see the article "Experimental Laser Display for Large Screen Presentation," Texas Instrument Bulletin number DLA 1324, (1966) or U.S. Pat. No. 3,436,546.

Laser projection systems offer a number of advantages: they can have a compact structure, they have good brightness and a good contrast, a long service life and, moreover, they are also sufficiently cost-effective. Therefore, they are suitable not only for the home cinema market, but also for head-up displays, for example. Laser projectors exceed LED projectors in all details and also permit scanning projection in addition to the imaging projection, the scanning projection differing significantly from usual projectors: instead of projecting an image onto the screen, the image is constructed pixel-by-pixel. Typically, a scanning device (or scanner) having a mirror, the fast axis of which oscillates with a frequency of the order of approximately 30 kHz, is used to steer three laser beams (as a rule, respectively one laser beam for the colors of red, green, blue) or a spatially superposed laser beam, in which the three partial beams for the colors of red, green and blue run collinearly, onto the respective pixels on the screen.

However, laser projectors have a serious disadvantage: since laser radiation is coherent, so-called speckle noise, a granular (i.e., grainy) interference effect, which significantly reduces the image quality, arises. Speckle noise occurs not only in the case of laser projectors, but wherever laser light sources are used for imaging or metrological purposes, for instance in interferometric metrology as well.

Therefore, the use of methods that eliminate or at least significantly reduce the speckle noise is necessary to increase image quality. A simple but effective method for reducing the speckle noise consists of using a rotating ground glass screen, for example, the latter consisting of corrugated glass. If the ground glass screen is put into motion (e.g., into rotation), there is a change in the arising speckle patterns. If the speckle patterns in this case move quickly in comparison with the integration time of the detector (a camera or the eye), many mutually independent speckle patterns are integrated and the speckle noise is reduced. From a different point of view, the roughness of the ground glass screen surface produces phase fluctuations in the light field. If these fluctuations are faster than the integration time of the detector, this leads to an effective reduction in the spatial coherence of the light field, and hence to a reduction of the speckle. However, on account of the specific projector geometry, in which the pixels are illuminated individually, this method cannot be applied in a laser projector: this is because, in the case of a resolution of 1280×720 pixels, for example, and an image refresh rate of 60 Hz, each pixel is only illuminated for approximately 18 ns. Since the speckle reduction must take place at this timescale, the use of the rotating ground glass screen becomes superfluous since the expediently reachable ground glass screen rotation frequency is much too low: the ground glass screen is practically stationary on the timescale of nanoseconds.

Therefore, a number of alternative procedures were examined in the literature to address the speckle problem in the case of laser projectors. An overview is provided by the dissertation "Speckle Reduction in Projection Systems" by F. Riechert, University of Karlsruhe, 2009. The goal of these methods is to superpose mutually independent (i.e., decorrelated) speckle patterns in incoherent fashion (i.e., on the basis of intensity). Here, a decorrelation can be implemented by way of wavelength or polarization diversity, for instance. However, the light sources required for wavelength diversity are larger, more expensive or have a lower luminous intensity; moreover, the (unpredictable) influence of the structure of the employed screen was found to be problematic. Once again, the unknown influence of the screen type on the polarization and the low achievable number of independent speckle patterns argues against polarization diversity.

A further option for reducing speckle consists in angle diversity of the illumination. In this case, the number of achievable, decorrelated speckle patterns is likewise limited, to be precise by the ratio of the illumination aperture to the observation aperture. Since the area of the mirror employed during the projection is relatively low on account of the high frequencies to be produced, this method is not optimally suited to reduce the speckle noise either. Something similar applies to the use of spatially separated regions of the screen for the purposes of producing the decorrelated speckle patterns.

To achieve the necessary incoherent superposition, use likewise can be made of various methods. First, one can use different laser light sources that are incoherent in relation to one another, even if they have the same wavelength (e.g., on account of small differences in the wavelength, or random phase jumps). However, this once again increases costs and installation size of the laser projector. Second, the use of an orthogonal polarization, too, leads to an incoherent superposition, albeit with the same restrictions as above. Third, delay paths use a temporal incoherence of the light source to make the superposition on the detector incoherent. Here, the number of the incoherently superposed speckle patterns depends on the embodiment of the delay path. Fourth, time integration can be carried out by each detector in the case of a rotating ground glass screen. The speckle patterns that are independent on account of the rotation of the ground glass screen are summed during the integration time of the detector; interference of these patterns incident temporally in succession does not occur. However, this solution is opposed by the fact that the averaging would have to occur within approximately 20 ns, as described above. A ground glass screen with a corresponding speed would be too complicated from a mechanical point of view and susceptible to errors, if it could even be realized.

U.S. Pat. No. 6,233,025 B1 describes a method and an apparatus for producing at least three laser beams of different wavelengths for the purposes of displaying color video images. In the apparatus, the output of a pulsed laser is supplied to a medium with nonlinear optical characteristics as an excitation beam. In one example, the nonlinear optical medium is arranged in an optical parametric oscillator. The optical parametric oscillator produces a signal beam and an idler beam in addition to the initial beam, which passes through the optical parametric oscillator without a frequency shift, said signal beam and idler beam—optionally after a frequency conversion—being used together with the initial beam for displaying monochromatic partial images of a color video image. U.S. Pat. No. 6,233,025 B1 specifies that it is possible to suppress the speckle noise by virtue of the pulsed laser producing laser pulses with a pulse duration of less than 1 ps for the purposes of exciting the nonlinear optical medium. However, the initial beam (or the laser pulses) itself is used for the purposes of producing the superposed laser beam or for a monochromatic partial image in U.S. Pat. No. 6,233,025 B1. Phase fluctuations do not occur in the initial beam, i.e., the coherent pulsed laser light, and so speckle noise likewise occurs in the monochromatic partial image produced by the initial beam. What is particularly unsuitable is that the initial beam is used for the green partial image, to which the human eye is particularly sensitive. Speckle noise at this wavelength is perceived to be particularly bothersome.

SUMMARY

The present disclosure provides laser light sources and laser projectors with such laser light sources, and methods for operating such laser light sources and methods for operating such laser projectors, all of which facilitate an effective suppression of speckle noise.

In one aspect, the present disclosure features laser light sources that include at least two optical devices, e.g., at least two optical parametric oscillators, which each have a non-linear optical medium for respectively producing a signal beam and an idler beam, and a superposition device, which is embodied (or configured) to respectively (spatially) superpose either the signal beam or the idler beam of the at least two optical devices for producing the laser beam with the at least two wavelengths.

What is proposed according to the present disclosure is to realize the production of the laser beam, which can be used for projection in a laser projector, for example, with the aid of a plurality of optical devices, e.g., with the aid of three optical devices, which each have a nonlinear optical medium. The optical devices or the corresponding nonlinear media are embodied to carry out the so-called "parametric down-conversion" (PDC). The PDC is based on the nonlinear interaction of a pump beam of a coherent pump source (e.g., a conventional laser) with the nonlinear optical medium (e.g., a nonlinear crystal). During this interaction, two new light fields arise, which are referred to as signal beam and idler beam in the present application—as is generally conventional. The signal beam and the idler beam conserve the energy $\omega_P$ and the momentum $\vec{k}_P$ of the pump beam; i.e., $\omega_P = \omega_S + \omega_I$ applies to the energy, where $\omega_S$ denotes the energy of the signal beam and $\omega_I$ denotes the energy of the idler beam. Accordingly, $\vec{k}_P = \vec{k}_S + \vec{k}_I$ applies for the momentum $\vec{k}_P$ of the pump beam, the momentum $\vec{k}_S$ of the signal beam and the momentum $\vec{k}_I$ of the idler beam. The signal beam and the idler beam differ at least in terms of their wavelength. Typically, the beam with the shorter wavelength is referred to as signal beam and the beam with the longer wavelength is referred to as idler beam. Additionally, the signal beam and the idler beam may optionally differ in further properties; however, this depends on the selected non-linear medium or the nonlinear crystal, and on the physical implementation.

The optical device which is used for carrying out a PDC process in the nonlinear optical medium can be an optical parametric oscillator (OPO), for example, which can be embodied, e.g., as in the above-described U.S. Pat. No. 6,233,025 B1, the entirety thereof being incorporated into the content of the present application by reference. A laser light source with optical parametric oscillators can be realized in a similarly compact and cost-effective fashion as a conventional laser light source and has a similar brightness; i.e., it unifies the same advantages as a conventional laser light source in a laser projector.

The laser light source with the optical devices or with the optical parametric oscillators can differ from such a conventional laser light source in one essential point: on account of the functional principle, phase fluctuations occur in the light field at the output of a respective OPO, wherein phase fluctuations occur at time scales on the order of one picosecond. This relates to the light production in the case of PDC systems, which is based on the nonlinear interaction of the pump beam of a coherent pump source (e.g., a conventional laser) with the nonlinear optical medium (e.g., a nonlinear crystal), as described further herein.

While the signal beam and the idler beam have strong correlations as a result of the common creation process in the non-linear medium, the signal beam and the idler beam, on their own, have the fluctuation behaviour of thermal light sources; see the dissertation "Development of a versatile source of single photons," by M. Förtsch, University of Erlangen, 2015. These fluctuations are fast enough, for example, to arrive at an averaging of several 1,000 to 10,000 independent speckle patterns during the aforementioned 20 ns, which are available for the production of a pixel, as a result of which the speckle noise is practically completely eliminated. From a physical point of view, this solution corresponds to the aforementioned ground glass screen with a correspondingly high rotational speed, where the decorrelation arises by the phase fluctuations and the incoherent superposition is achieved by the finite integration time of the eye or the detector when observing the image.

In contrast to U.S. Pat. No. 6,233,025 B1, which is cited above, the production of the required light can be implemented by means of optical parametric oscillators in the laser light source according to the present disclosure, in particular, while avoiding a need for any additional frequency doubling units. This facilitates a significantly more efficient and compact overall system.

In some embodiments, the laser light source includes at least three optical devices, e.g., exactly three optical devices, for respectively producing a signal beam and an idler beam, and the superposition device is embodied to respectively superpose either the signal beam or the idler beam of the (at least) three optical devices for the purposes of producing the laser beam with the at least two different wavelengths, e.g., with at least three different wavelengths, for example, with exactly three different wavelengths. Typically, three different wavelengths are sufficient for producing a color image (e.g., a color video image). When using the laser light source for a laser projector, the three wavelengths of the laser beam, which is used for the projection, lie in the visible wavelength range. Optionally, the wavelength of a respective signal beam or of a respective idler beam can be modified with the aid of a frequency conversion device to produce the desired frequency or wavelength for the projection.

By way of example, the three wavelengths of the laser beam can be wavelengths in the red wavelength range between approximately 635 nm and approximately 780 nm, in the green wavelength range between approximately 520 nm and approximately 540 nm and in the blue wavelength range between approximately 400 nm and approximately 470 nm. However, in principle, it is also possible to use other wavelengths in the visible wavelength range, which facilitate the production of a color video image by additive color mixing.

Different nonlinear optical media, e.g., different nonlinear optical crystals, can be used in the optical devices to produce signal beams or idler beams with different wavelengths. However, the wavelengths of the signal beam and of the idler beam can likewise be varied within certain boundaries by setting a different temperature of a nonlinear optical medium or crystal of the same type. Reference is made to U.S. Pat. No. 6,233,025 B1, cited at the outset, in respect of the use of nonlinear optical crystals that can be used for the present application.

In a further embodiment, the laser light source includes at least one pump source for producing at least one pump beam (in the form of a laser beam with a pump wavelength) for exciting the nonlinear optical media of the at least two optical devices. By way of example, three identical pump sources in the form of laser light sources, e.g., in the form of laser diodes, can be used for the production of the pump beams, it being possible to set the amplitudes of said pump sources individually to produce the desired colour for a respective pixel of the image. The pump source can be operated in pulsed fashion, where the pulse frequency may be tuned, in particular, to a clock frequency for producing the pixels of the image.

In a further embodiment, the laser light source includes, in the beam path downstream of a respective optical device, e.g., in the superposition device, at least one optical filter element, e.g., a wavelength-selective optical filter element, for filtering either the signal beam not used for the superposition or the idler beam not used for the superposition of the respective optical device. The use of an optical filter element is advantageous or necessary if the pump beam, the signal beam and the idler beam emerge in collinear fashion from the respective optical device, and so a spatial separation is not readily possible. In this case, it is necessary prior to the superposition to filter or eliminate both the respective other beam (idler beam or signal beam) not used for the superposition and the pump beam. One and the same wavelength-selective optical element can be used for filtering the pump beam and filtering the signal beam or idler beam; however, it is also possible to use two or more different wavelength-selective optical elements to this end. The wavelength-selective optical element or elements can be, for example, part of the superposition device. By way of example, in this case, the wavelength-selective optical element can be embodied to deflect only the signal beam or only the idler beam into a direction that is suitable for the production of the laser beam. A different type of optical filter element, for example a filter element that is based on polarization filtering or, optionally, spatial filtering, can also be used in place of a wavelength-selective optical element.

By way of example, the wavelength-selective optical (filter) element can be a dichroic mirror, a prism with a wavelength-selective coating, etc. In contrast to the laser light source described here, no wavelength-selective optical element is required in U.S. Pat. No. 6,233,025 B1, since both the signal beam and the idler beam are used there for the production of monochromatic partial images.

Another aspect of the present disclosure features a laser projector, including: a laser light source as described further above for producing a laser beam with at least two different wavelengths, in particular with exactly three different wavelengths, and a scanning device for two-dimensional deflection of the laser beam for producing the image on the projection surface. The laser projector may include additional optical elements, for example a focusing device for focusing the laser beam at an adjustable or predetermined distance, at which the projection surface is typically found. The scanning device can be actuated with the aid of a control device in order to produce an image with a resolution of, e.g., 1280×720 pixels and an image refresh rate of, e.g., 60 Hz, similar to the case in a conventional television. Here, the laser beam passes over the image line-by-line in a scanning movement, with 720 pixels being produced in each case. As described further above, producing a very dynamic movement of the laser beam is necessary to this end.

As an alternative to a laser projector, in which the (superposed) laser beam is deflected in two dimensions by the scanning device to produce the image on the projection surface, the laser projector may include two or more scanning devices, which each deflect the signal beam or the idler beam of a respective optical device to the same point or pixel on the projection surface. In this case, the superposition to form the laser beam with the at least two different wavelengths only occurs on, or in the region of, the projection surface.

In one embodiment, the scanning device for two-dimensional deflection of the laser beam includes a mirror. As described further above, the high image refresh rates require a highly dynamic movement during the deflection of the laser beam, in particular along the fast axis, i.e., along a respective line of the image to be produced. In place of a single mirror, the scanning device may optionally also include two or more mirrors or other optical elements, which facilitate the two-dimensional deflection of the laser beam; see, for example, U.S. Pat. No. 3,436,546, cited at the outset, in which a polygonal mirror in combination with an oscillating mirror is used to this end.

In a further embodiment, the laser projector includes a control device, which is embodied to modulate the amplitudes of the pump beam or beams of the at least one pump source depending on an image to be produced on the projection surface. The color of a respective pixel can be set by modulating the amplitude or the power of the pump beams of the individual pump sources, like in the case of a conventional laser projector. The modulation or the change in the power of the pump beam(s) can be undertaken directly in a respective pump source, for example in the form of a laser diode. However, the modulation may also be undertaken in optical modulators which are disposed downstream of the pump sources in the beam path, as described in U.S. Pat. No. 6,233,025 B1, cited at the outset.

The laser light source described here, which produces an incoherent laser beam with at least two different wavelengths, can be used in advantageous fashion not only in a laser projector but also in other applications in the field of imaging technology or in the field of interferometric metrology.

A further aspect of the present disclosure features methods of operating a laser light source according to one of the embodiments described herein. Within the scope of the methods, a signal beam and an idler beam are respectively produced by means of a first optical device of the at least two optical devices and a second optical device of the at least two optical devices. Here, either the signal beam or the idler beam of the first optical device with a first wavelength of the at least two different wavelengths is selected and either the signal beam or the idler beam of the second optical device with a second wavelength, differing from the first wavelength, of the at least two different wavelengths is selected. Here, the laser beam with the at least two different wavelengths is produced by virtue of the respectively selected signal beam or idler beam of the first optical device and the second optical device being superposed. In particular, the advantages that were already explained above in relation to the laser light source and the laser projector arise within the scope of the method.

In a further variant of the methods, a further signal beam and a further idler beam are produced by means of a third optical device of the at least three optical devices, where either the signal beam or the idler beam of the third optical device with a third wavelength that differs from the first wavelength and the second wavelength is selected. Here, the laser beam is produced with the at least two different wavelengths, preferably with at least three different wavelengths, in particular with exactly three different wavelengths, by virtue of the respectively selected signal beam or idler beam of the first optical device, the second optical device and the third optical device being superposed.

Another aspect of the present disclosure features a method for operating a laser projector according to any one of the embodiments described above. Within the scope of the method, the laser light source is operated with the method for operating the laser light source. The advantages which were already explained in relation to the laser light source, the laser projector and the method for operating the laser light source, in particular, arise within the scope of the method.

Further advantages of the present disclosure emerge from the description and the drawings. Likewise, the features specified above and the features yet to be listed below can find use both on their own and together in any combinations. The shown and described embodiments should not be considered an exhaustive list but, instead, are examples for the purposes of explaining the present disclosure.

Identical reference signs are used in the following description of the drawings for the same or functionally equivalent components.

DETAILED DESCRIPTION

Figure 1:
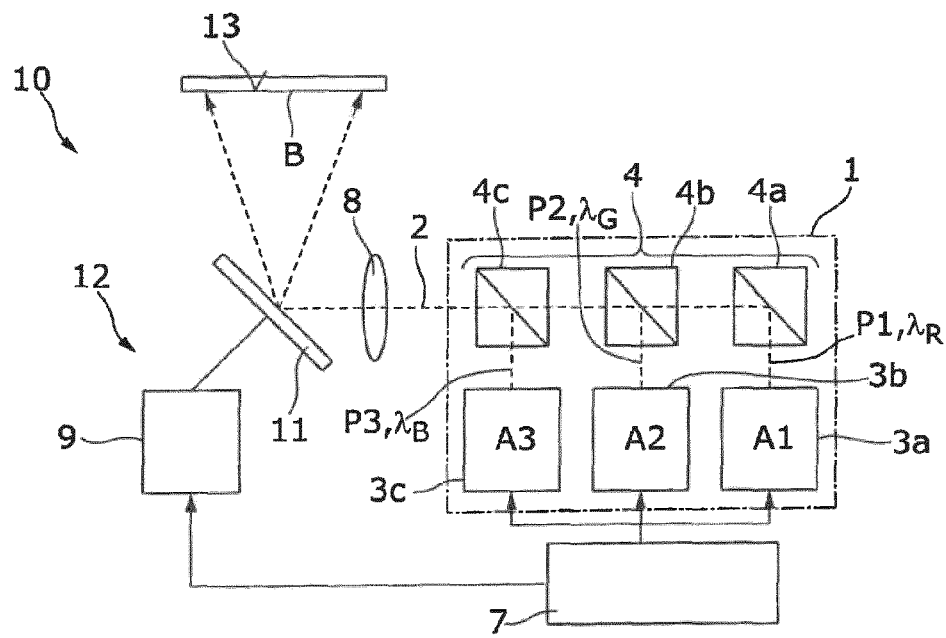
FIG. 1 is a schematic illustration of a laser projector, which has a laser light source for producing a laser beam with three different wavelengths for the purposes of producing a color image.

FIG. 1 shows an exemplary embodiment of a laser light source 1, which includes three light sources 3a-c (A1, A2, and A3) in the form of three laser diodes. The three light sources 3a-c are configured to produce three laser beams P1, P2, P3, of which the first laser beam P1 has a wavelength $\lambda_R$ in the red wavelength range, the second laser beam P2 has a second wavelength $\lambda_G$ in the green wavelength range, and the third laser beam P3 has a third wavelength $\lambda_B$ in the blue wavelength range. The three laser beams P1, P2, P3, produced by the three light sources 3a-c, are each deflected through 90° by three mirrored cuboid prism cubes 4a-c and superposed in a collinear fashion, and so a single laser beam 2 with three different wavelengths $\lambda_R$, $\lambda_G$, $\lambda_B$ is produced at the output of the laser light source 1.

As may likewise be identified in FIG. 1, the laser light source 1 forms part of a laser projector 10 for producing an image B on a projection surface 13 (screen). For the purposes of producing the image B, the laser projector 10 includes a scanning device (or a scanner) 12 with a scanning mirror 11, which is rotatable about two axes for the two-dimensional deflection of the laser beam 2. For the purposes of producing a two-dimensional deflection movement of the scanner mirror 11, the scanning device 12 includes a rotation driver 9. The rotation driver 9 is configured to drive the scanning mirror 11 to deflect the laser beam 2 onto the projection surface 13 with a high scanning frequency to construct the image B, line-by-line, on the projection surface 13.

The laser projector 10 also includes a focusing device 8 to focus the laser beam 2 onto the projection surface 13. In the shown example, the focusing device 8 is a lens that is arranged between the laser light source 1 and the scanning mirror 11. However, it is understood that the focusing device 8 can also be arranged in the beam path of the laser beam 2 downstream of the scanning device 12.

Moreover, the laser projector 10 includes a control device (or controller) 7, which actuates the three light sources 3a-c to individually modulate the amplitudes A1, A2, A3 of the three laser beams P1, P2, P3. The control device 7 also serves to actuate the rotation driver 9, said actuation being implemented in synchronized fashion with the modulation of the amplitudes A1, A2, A3 to ensure that a desired color is produced at a respective pixel of the image B on the projection surface 13.

The laser beam 2 with the three different wavelengths $\lambda_R$, $\lambda_G$, $\lambda_B$, which is produced by the laser light source 1 of FIG. 1, is coherent and therefore leads to speckle noise of the image B produced on the projection surface 13. To avoid the occurrence of speckle noise, or to suppress this to the greatest possible extent (practically to 100%), a laser light source 1a for producing an incoherent laser beam 2, as illustrated in FIG. 2, is used in the laser projector 10 of FIG. 1.

Figure 2:
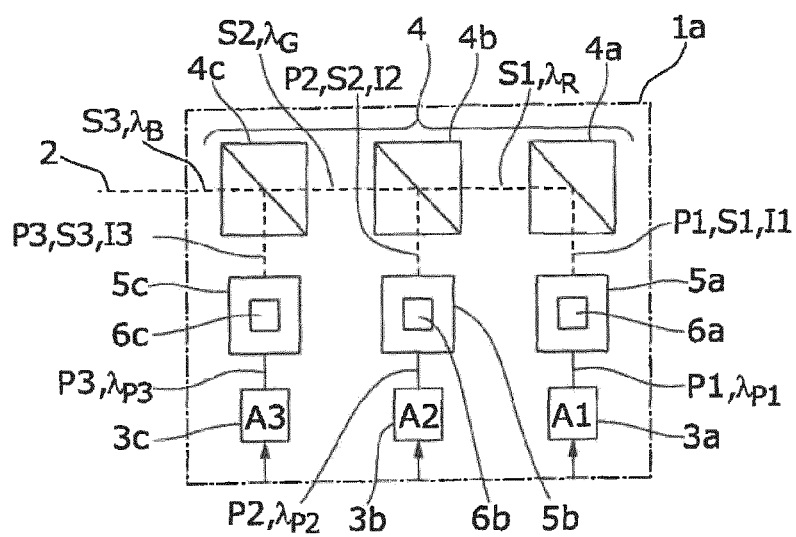
FIG. 2 is a schematic illustration of a laser light source for the laser projector of FIG. 1, which produces a non-coherent laser beam for the purposes of suppressing speckle noise.

The laser light source 1a of FIG. 2 has three optical devices in the form of optical parametric oscillators 5a-c, into which three pump beams P1, P2, P3 are coupled, said pump beams, like in FIG. 1, being produced by three laser or pump sources 3a-c in the form of laser diodes. Unlike in FIG. 1, the three pump beams P1, P2, P3 are produced by three structurally identical laser diodes in the laser light source 1a shown in FIG. 2; i.e., the wavelengths $\lambda_{P1}$, $\lambda_{P2}$, $\lambda_{P3}$ of the three pump beams P1, P2, P3 coincide in the shown example and may lie in the range between 350 nm and 400 nm, for example.

The optical parametric oscillators 5a-c each have a nonlinear optical medium in the form of a nonlinear crystal 6a-c. By way of example, the nonlinear optical crystals 6a-c can be lithium triborate crystals, but also other optical nonlinear crystals, for example beta barium borate (BBO). What is essential is that a parametric down-conversion (PDC) process may occur in the respective nonlinear crystal. Examples of nonlinear crystals, in which such a process may occur, are specified in U.S. Pat. No. 6,233,025 B1.

In a PDC process, the respective pump beam P1, P2, P3 interacts with the nonlinear crystal 6a-c, where two new light fields are produced, which are referred to as signal beam S1, S2, S3 and idler beam I1, I2, I3 below. The PDC process conserves the energy $\omega_{P1}, \omega_{P2}, \omega_{P3}$ and the momentum $\vec{k}_{P1}, \vec{k}_{P2}, \vec{k}_{P3}$ of the respective pump beam P1, P2, P3; i.e., $\omega_{Pi}=\omega_{Si}+=1, 2, 3$) applies to the energy, where $\omega_{Si}$ denotes the energy of the respective signal beam S1, S2, S3 and $\omega_{Ii}$ denotes the energy of the respective idler beam I1, I2, I3. The corresponding momenta are also conserved, i.e., the following applies: $\vec{k}_{Pi}=\vec{k}_{Si}+\vec{k}_{Ii}$.

The three optical parametric oscillators 5a-c each form an optical resonator, in which the nonlinear optical crystal 6a-c is arranged. The optical parametric oscillators 5a-c are operated under the laser threshold (i.e., not in the gain regime) in to avoid a (partial) stimulated emission arising, which would cause an unwanted phase relationship. When operating the optical parametric oscillators 5a-c below the laser threshold, the power of the signal beam S1, S2, S3 or of the idler beam I1, I2, I3 can scale substantially linearly with the power of the respective pump beam P1, P2, P3.

The energy $\omega Pi$ of the respective pump beam P1, P2, P3 is divided among the respective signal beam S1, S2, S3 and the respective idler beam I1, I2, I3 in the PDC process; i.e., the respective signal beam S1, S2, S3 and the respective idler beam I1, I2, I3 each have a wavelength that deviates from the associated pump beam P1, P2, P3. By way of a suitable choice of the respective nonlinear optical crystal 6a-c or by way of a suitable setting of, e.g., the temperature of the respective nonlinear optical crystal 6a-c, it is possible to implement a desired subdivision of the energy $\omega_{Pi}$ of the respective pump beams P1, P2, P3 among the respective signal beam S1, S2, S3 and the respective idler beam I1, I2, I3.

The energy $\omega_P$ of the respective pump beams P1, P2, P3 can be subdivided in such a way that, in the first nonlinear optical crystal 6a, the signal beam S1 has a wavelength $\lambda_R$ in the red wavelength range between approximately 635 nm and approximately 780 nm. Accordingly, the signal beam S2, which is produced by the second nonlinear crystal 6b, can have a wavelength $\lambda_G$ in the green wavelength range, e.g., between approximately 520 nm and approximately 540 nm. In the nonlinear interaction in the third nonlinear crystal 6c, it is possible to produce a third signal beam S3 with a wavelength $\lambda_B$ in the blue wavelength range between approximately 400 nm and approximately 470 nm.

In the example shown in FIG. 2, the three signal beams S1, S2, S3, which are produced by the three optical parametric oscillators 5a-c, are superposed in a superposition device 4 which, to this end, has three optical elements 4a-c in the form of cube-shaped prisms. In FIG. 2, the optical elements 4a-c of the superposition device 4 are wavelength-selective optical elements, which are provided with a (respectively different) wavelength-selective coating.

The first signal beam S1 with the red wavelength $\lambda_R$ is deflected at the first wavelength-selective element (or wavelength selector) 4a, while both the first pump beam P1 and the first idler beam I1 are filtered. Accordingly, the second signal beam S2 with the green wavelength $\lambda_G$ is deflected at the second wavelength-selective element 4b, while the second idler beam I2 and the second pump beam P2 are filtered. The third signal beam S3 with the blue wavelength $\lambda_B$ is deflected at the third wavelength-selective element 4c, while the third idler beam I3 and the third pump beam P3 are filtered.

On account of the arrangement of the three wavelength-selective elements 4a-c in a line, the three signal beams S1, S2, S3 are superposed in collinear fashion and form a laser beam 2, which has three different wavelengths $\lambda_R, \lambda_G, \lambda_B$ in the red, in the green and in the blue wavelength ranges, to produce the desired color image B on the projection surface 13. It is understood that the wavelength-selective optical elements 4a-c need not necessarily form part of the superposition device 4 but may optionally be arranged in the beam path between the respective optical parametric oscillator 5a-c and the superposition device 4 to suppress the respectively unwanted radiation components. It is also possible to use other (optical) filter elements in place of wavelength-selective optical elements 4a-c.

Optionally, it is also possible to realize a superposition of the three signal beams S1, S2, S3 only on the projection surface 13—this is not illustrated in FIG. 2. The laser beam 2 with the three different wavelengths $\lambda_R, \lambda_G, \lambda_B$ is produced only on, or in the region of, the projection surface 13 in this case. Here, preferably, provision is made of, in particular, three scanning devices, each with at least one scanning mirror for the two-dimensional deflection of the first signal beam S1, the second signal beam S2 and the third signal beam S3, as an alternative to the three cube-shaped prisms 4a-c of the aforementioned type, where the three signal beams S1, S2, S3 are each steered to a respective pixel of the image B on the projection surface 13. In this case, the three scanning devices form a superposition device for producing the laser beam 2 with the three different wavelengths $\lambda_R, \lambda_G, \lambda_B$.

As described above, practically no speckle noise is caused on the projection surface 13 by the incoherent laser beam 2, which is produced by the laser light source 1a shown in FIG. 2, since the signal beams S1, S2, S3 each have phase fluctuations on account of their production in the nonlinear crystals 6a-c, said phase fluctuations occurring on timescales of the order of picoseconds. Therefore, the three signal beams S1, S2, S3 each have the fluctuation behaviour of thermal light sources; i.e., each individual one of the three signal beams S1, S2, S3 is incoherent. In contrast thereto, a respective signal beam S1, S2, S3 and a respective idler beam I1, I2, I3, which are produced together in one and the same nonlinear optical crystal 6a-c, are strongly correlated. For this reason, only the signal beams S1, S2, S3 of the respective optical parametric oscillators 5a-c are superposed in each case in the laser light source 1a shown in FIG. 2.

It is understood that the three idler beams I1, I2, I3 can also be superposed to form the laser beam 2 instead of the superposition of the signal beams S1, S2, S3. It is likewise possible to superpose one idler beam, for example the first idler beam I1, with two signal beams, for example with the second and the third signal beam S2, S3, or to superpose two of the idler beams, for example the first and the second idler beam I1, I2, with one signal beam, for example with the third signal beam S3.

Below, a method is described for operating the laser light source 1a of the above-described type. Here, a signal beam S1, S2, S3 and an idler beam I1, I2, I3 are respectively produced by a first optical device 5a of the three optical devices 5*a-c*, a second optical device 5*b* of the three optical devices 5*a-c* and a third optical device 5*c* of the three optical devices 5*a-c*. Here, either the signal beam S1 or the idler beam I1 of the first optical device 5*a* is selected with a first wavelength $\lambda_R$ of the three different wavelengths $\lambda_R$, $\lambda_G$, $\lambda_B$, where either the signal beam S2 or the idler beam I2 of the second optical device 5*b* with a second wavelength $\lambda_G$, differing from the first wavelength 4, of the three different wavelengths $\lambda_R$, $\lambda_G$, $\lambda_B$, is selected, and where either the signal beam S3 or the idler beam I3 of the third optical device 5*c* with a third wavelength 4, differing from the first wavelength $\lambda_R$ and the second wavelength $\lambda_G$, of the three different wavelengths $\lambda_R$, $\lambda_G$, $\lambda_B$ is selected. Here, the laser beam 2 with the three different wavelengths $\lambda_R$, $\lambda_G$, $\lambda_B$ is produced by virtue of the respectively selected signal beam S1, S2, S3 or idler beam I1, I2, I3 of the first optical device 5*a*, the second optical device 5*b* and the third optical device 5*c* being superposed.

A method for operating a laser projector 10 of the above-described type can include operating the laser light source 1*a*. The laser light source 1*a* can be operated according to the above-explained method for operating the laser light source 1*a*. The method can include operating the laser light source 1*a* to produce multiple signal beams and idler beams by corresponding optical devices in the laser light source 1*a*. Each of the optical devices includes a respective nonlinear optical medium for producing a respective signal beam and a respective idler beam. One of the respective signal beam and the respective idler beam produced by each of the optical devices is superposed together, e.g., by a superposition device, to obtain an incoherent laser beam having at least two different wavelengths. The superposed beams have different wavelengths and are incoherent from each other. The laser beam can be deflected in two dimensions by a scanner of the laser projector 10 to produce an image on a projection surface. The image can be speckle-free or with reduced speckle noise.

In conclusion, it is possible to realize a laser projector 10, in which the image B is practically free from speckle noise, with the laser light source 1*a* shown in FIG. 2. It is understood that the laser light source 1*a* of FIG. 2 or a suitably modified laser light source 1*a*, which, e.g., produces a laser beam 2 with only two or, optionally, with more than three different wavelengths, also can be used advantageously in other imaging methods or in metrology.

OTHER EMBODIMENTS

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A laser light source for producing incoherent laser beams having at least three different wavelengths, the laser light source comprising:
   at least three optical devices, each comprising a respective optical parametric oscillator having an optical resonator and a nonlinear optical medium arranged in the optical resonator for producing a respective signal beam and a respective idler beam from a respective pump beam, wherein a frequency of the respective pump beam is identical to a sum of a frequency of the respective signal beam and a frequency of the respective idler beam; and
   a superposition device coupled to the at least three optical devices and configured to spatially superpose only one of the respective signal beam and the respective idler beam produced by each of the at least three optical devices to produce an incoherent laser beam having the at least three different wavelengths.

2. The laser light source of claim 1, further comprising at least one pump source configured to produce at least one pump beam for exciting the respective nonlinear optical media of the at least three optical devices.

3. The laser light source of claim 1, further comprising, in a beam path downstream of each of the at least three optical devices, at least one optical filter configured to filter the other one of the respective signal beam and the respective idler beam that is not used for the superposition.

4. The laser light source of claim 3, wherein the at least one optical filter is configured to filter the respective pump beam of a corresponding pump source for exciting the nonlinear optical medium of the respective optical parametric oscillator of the optical device.

5. The laser light source of claim 3, wherein the at least one optical filter is part of the superposition device.

6. The laser light source of claim 1, wherein the at least three different wavelengths comprise:
   a first wavelength in a red wavelength range between approximately 635 nm and approximately 780 nm,
   a second wavelength in a green wavelength range between approximately 520 nm and approximately 540 nm, and
   a third wavelength in a blue wavelength range between approximately 400 nm and approximately 470 nm.

7. The laser light source of claim 1, wherein the superposed ones of the respective signal beam and the respective idler beam have different wavelengths and are incoherent from each other, and
   wherein the incoherent laser beam is capable of producing an image with reduced speckle noise.

8. The laser light source of claim 1, comprising at least three wavelength-selective optical elements each arranged downstream of a corresponding optical device of the at least three optical devices and configured to select only one of the respective signal beam and the respective idler beam produced by the corresponding optical device,
   wherein the superposition device is configured to spatially superpose the selected only one of the respective signal beam and the respective idler beam produced by each of the at least three optical devices to produce the incoherent laser beam having the at least three different wavelengths.

9. The laser light source of claim 8, wherein each of the at least three wavelength-selective optical elements is included in the superposition device or arranged between the corresponding optical device of the at least three optical devices and the superposition device.

10. The laser light source of claim 1, wherein the superposition device comprises at least three cube-shaped prisms each being arranged downstream of a corresponding one of the at least three optical devices.

11. A laser projector for producing an image with reduced speckle noise on a projection surface, the laser projector comprising:
   a laser light source comprising:
      at least three optical devices each comprising a respective optical parametric oscillator having an optical resonator and a nonlinear optical medium arranged in the optical resonator for producing a respective signal beam and a respective idler beam from a respective pump beam, wherein a frequency of the respective pump beam is identical to a sum of a frequency of the respective signal beam and a frequency of the respective idler beam; and a superposition device coupled to the at least three optical devices and configured to spatially superpose only one of the respective signal beam and the respective idler beam produced by each of the at least three optical devices to produce an incoherent laser beam having at least three different wavelengths; and a scanner arranged to provide a two-dimensional deflection of the incoherent laser beam to produce the image on the projection surface.

12. The laser projector of claim 11, wherein the scanner comprises at least one mirror.

13. The laser projector of claim 11, wherein the superposition device comprises at least three cube-shaped prisms each being arranged downstream of a corresponding one of the at least three optical devices.

14. The laser projector of claim 11, wherein the laser light source further comprises at least one pump source configured to produce at least one pump beam for exciting the respective nonlinear optical medium of each of the at least three optical devices.

15. The laser projector of claim 14, wherein the at least one pump source is configured to operate at a pulse frequency identical to a clock frequency for producing pixels of the image on the projection surface.

16. The laser projector of claim 14, further comprising a controller configured to modulate an amplitude of the at least one pump beam of the at least one pump source based on the image to be produced on the projection surface.

17. The laser projector of claim 16, wherein the controller is configured to actuate the scanner to produce the image with a specified resolution and a specified image refresh rate.

18. The laser projector of claim 14, further comprising a lens configured to focus the incoherent laser beam at an adjustable or predetermined distance from the lens, at which the projection surface is positioned.

19. A method comprising:
producing a first signal beam and a first idler beam by a first optical device of at least three optical devices in a laser light source, each of the at least three optical devices comprising a respective optical parametric oscillator having an optical resonator and a nonlinear optical medium arranged in the optical resonator for producing a respective signal beam and a respective idler beam from a respective pump beam, wherein a frequency of the respective pump beam is identical to a sum of a frequency of the respective signal beam and a frequency of the respective idler beam;

producing a second signal beam and a second idler beam by a second optical device of the at least three optical devices in the laser light source;

producing a third signal beam and a third idler beam by a third optical device of the at least three optical devices in the laser light source; and spatially superposing only one of the first signal beam and the first idler beam, only one of the second signal beam and the second idler beam, and only one of the third signal beam and the third idler beam to obtain an incoherent laser beam having at least three different wavelengths, wherein the only one of the first signal beam and the first idler beam has a first wavelength of the at least three different wavelengths, the only one of the second signal beam and the second idler beam has a second wavelength of the at least three different wavelengths, the second wavelength being different from the first wavelength, and the only one of the third signal beam and the third idler beam has a third wavelength of the at least three different wavelengths, the third wavelength being different from the first wavelength and the second wavelength.

20. The method of claim 19, further comprising:
deflecting the incoherent laser beam in two dimensions by a scanner to produce an image on a projection surface, wherein the laser light source and the scanner is in a laser projector.

* * * * *